United States Patent
Strobel

(10) Patent No.: US 6,234,743 B1
(45) Date of Patent: May 22, 2001

(54) STACKING COLUMN WITH IN-LINE RATCHET ELEMENTS HAVING ALTERNATE OFF SET CONTROL ARM PORTIONS

(75) Inventor: Gustav Strobel, Saulgau (DE)

(73) Assignee: MTS Maschinenbau GmbH, Mengen (DE)

( * ) Notice: Subject to any disclaimer, the term of this patent is extended or adjusted under 35 U.S.C. 154(b) by 0 days.

(21) Appl. No.: 09/273,970

(22) Filed: Mar. 22, 1999

(30) Foreign Application Priority Data

Mar. 21, 1998 (DE) .......................................... 298 05 178 U

(51) Int. Cl.[7] .................................................. B65B 35/50
(52) U.S. Cl. .................................... 414/788.1; 414/794.9; 414/795; 414/795.3; 211/150
(58) Field of Search ............................ 414/788.1, 794.9, 414/795, 795.3; 211/150, 149, 41.1

(56) References Cited

U.S. PATENT DOCUMENTS

| 5,005,712 | * | 4/1991 | Niederprum | 211/150 |
|---|---|---|---|---|
| 5,046,343 | * | 9/1991 | Miwa | 70/408 |
| 5,217,121 | * | 6/1993 | Walker | 211/150 |
| 5,301,824 | * | 4/1994 | Scholler | 211/150 |
| 5,373,756 | * | 12/1994 | Scholler | 414/795.3 |
| 5,433,096 | * | 7/1995 | Janssen et al. | 70/278 |
| 5,468,035 | * | 11/1995 | Fountain | 294/85 |
| 5,938,051 | * | 8/1999 | Scholler et al. | 211/150 |
| 5,988,777 | * | 11/1999 | Scholler | 211/150 |

FOREIGN PATENT DOCUMENTS

3811310 A1 * 10/1989 (DE) .

* cited by examiner

*Primary Examiner*—Joseph A. Fischetti
(74) *Attorney, Agent, or Firm*—Bachman & LaPointe, P.C.

(57) ABSTRACT

A stacking column for storing articles comprises a plurality of ratchet elements each having a carrying arm and a control arm. The plurality of ratchet elements are arranged successively in one plane such that the carrying arms of each ratchet element are arranged in one vertically extending plane and the control arm of each ratchet element is arranged in a laterally offset manner relative to the carrying arm of the same ratchet element between any two successive ratchet elements. The control arms of the ratchet elements are also arranged in a laterally alternating manner relative to the one vertically extending plane.

7 Claims, 3 Drawing Sheets

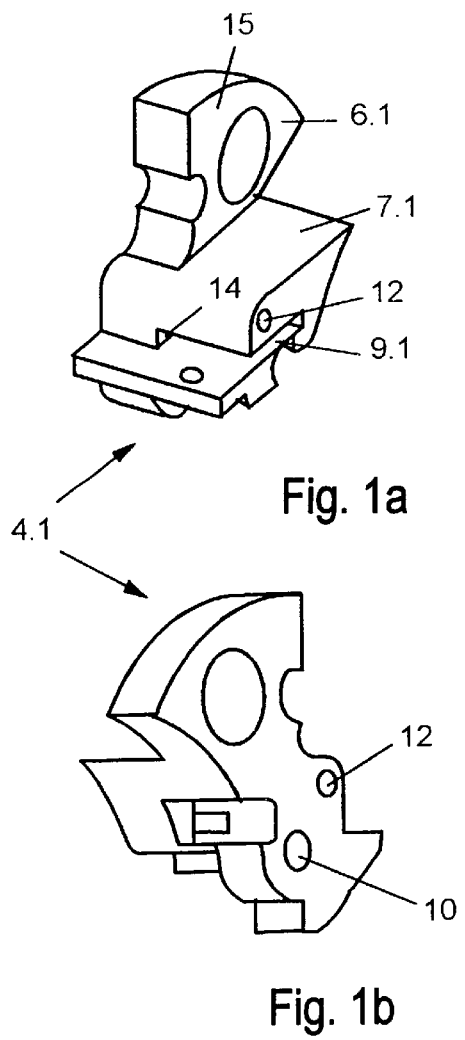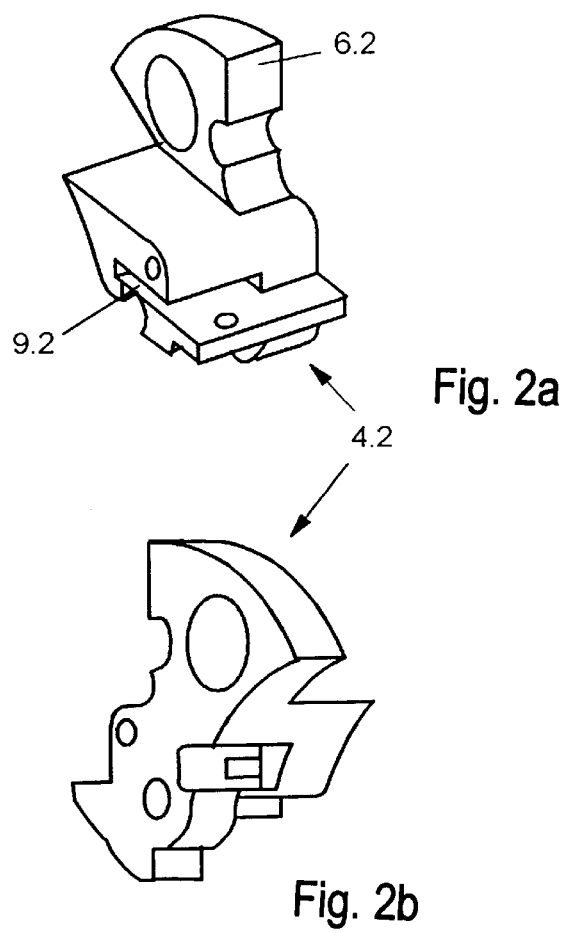

STACKING COLUMN WITH IN-LINE RATCHET ELEMENTS HAVING ALTERNATE OFF SET CONTROL ARM PORTIONS

BACKGROUND OF THE INVENTION

The invention relates to a stacking column for storing articles one above the other or one beside the other on ratchet elements, which have a carrying arm and a control arm.

Stacking columns of this type are known, and available on the market, in a wide variety of shapes and designs. Stacking columns are used, in particular, for the production of vehicle-body parts in the automobile industry. Robots are used to remove the appropriate vehicle-body parts from the presses and to store them intermediately in stacking columns before they are processed further. It is usual for four stacking columns to be set up in a rectangle. Each stacking column has a multiplicity of ratchet elements which are arranged one above the other. A first ratchet element is located in the standby position. If an article is positioned on this ratchet element, the ratchet element pivots into the operating position and, at the same time, carries along a following ratchet element, which in this way passes into the standby position. A stacking column of this type is known, for example, from DE 38 11 310 C2.

There are also horizontal stacking columns, for example those presented in U.S. Pat. No. 5,217,121, which serve a similar function.

In the case of all of these stacking columns, the successive ratchet elements are arranged alternately one beside the other, with the result that the corresponding carrying arms of successive ratchet elements are located in an offset manner in relation to one another. This results in the carrying arms of successive ratchet elements being positioned beneath the articles at different locations. Depending on the articles, this different arrangement of the carrying arms in relation to a stacking column may be problematic since uniform storage of the articles is desired.

The object of the present invention is to provide a stacking column of the above-mentioned type which eliminates the foregoing disadvantage, namely provides carrying arms which always grip beneath the articles at the same location.

SUMMARY OF THE INVENTION

The foregoing object is achieved by the control arm of each ratchet element being arranged in an offset manner in relation to the carrying arm.

Whereas in the case of the known stacking columns the control arm and carrying arm run approximately in one plane, the control arm and carrying arm according to the invention are intended to be arranged in an offset manner in relation to one another. This has the considerable advantage that, when two different ratchet elements are arranged successively, the carrying arms are located approximately in one plane, with the result that they always grip beneath the articles at the same locations. In the case of the two different types of ratchet element, the control arms are offset to the left or right in each case.

However, the present invention also results in the fact that, when just one type of ratchet element is used in a stacking column, it is possible for carrying arms which are offset from another to a relatively great extent to be arranged successively, which is desirable when, for example, two differently shaped articles are to be stacked successively. However, this is just a secondary effect of the present invention.

In one exemplary embodiment, the idea is for the control arm and carrying arm to be connected directly to one another or even to be produced in one piece, although this is relatively difficult since, for example, the ratchet element according to DE 38 11 310 C2 also has to have bores for a pivot pin and a stop pin. Furthermore, there are various means integrally formed on the ratchet element to provide for controlled movement from a rest position into a standby position and from a standby position into an operating position. It is therefore expedient to arrange a basic body between the actual control arms and the carrying arms. Said basic body may extend widthwise from an outer surface of the control arm to the outer surface of the carrying arm since it does not disturb any element of the following ratchet element as it moves.

It is preferable for the basic body and control arms to be produced in one piece from plastic, with the result that the corresponding bores and recesses for controlling the ratchet-element movement can be formed in the basic body and the control arm during production. In this case, it is also possible for the carrying arm to consist, for example, of a metallic material since it is merely a flat punched element. Said carrying arm is pushed into a slit in the basic body and is connected to the basic body via any desired fastening element, in particular a rivet. An inner wall of the slit runs approximately in a plane of an inner surface of the control arm, and it can be seen that the control arm and carrying arm are arranged in an offset manner in or on the basic body.

This invention makes it possible in a straight-forward manner for the carrying arms of successive ratchet elements of a vertical or even of a horizontal stacking column to be arranged approximately in one plane, with the result that articles are always gripped at the same locations.

BRIEF DESCRIPTION OF THE DRAWINGS

Further advantages, features and details of the invention can be gathered from the following description of preferred exemplary embodiments and with reference to the drawing, in which:

FIGS. 1*a* and 1*b* shows two perspective views of a left-hand ratchet element;

FIGS. 2*a* and 2*b* shows two perspective views of a right-hand ratchet element;

DETAILED DESCRIPTION

Figure 3:
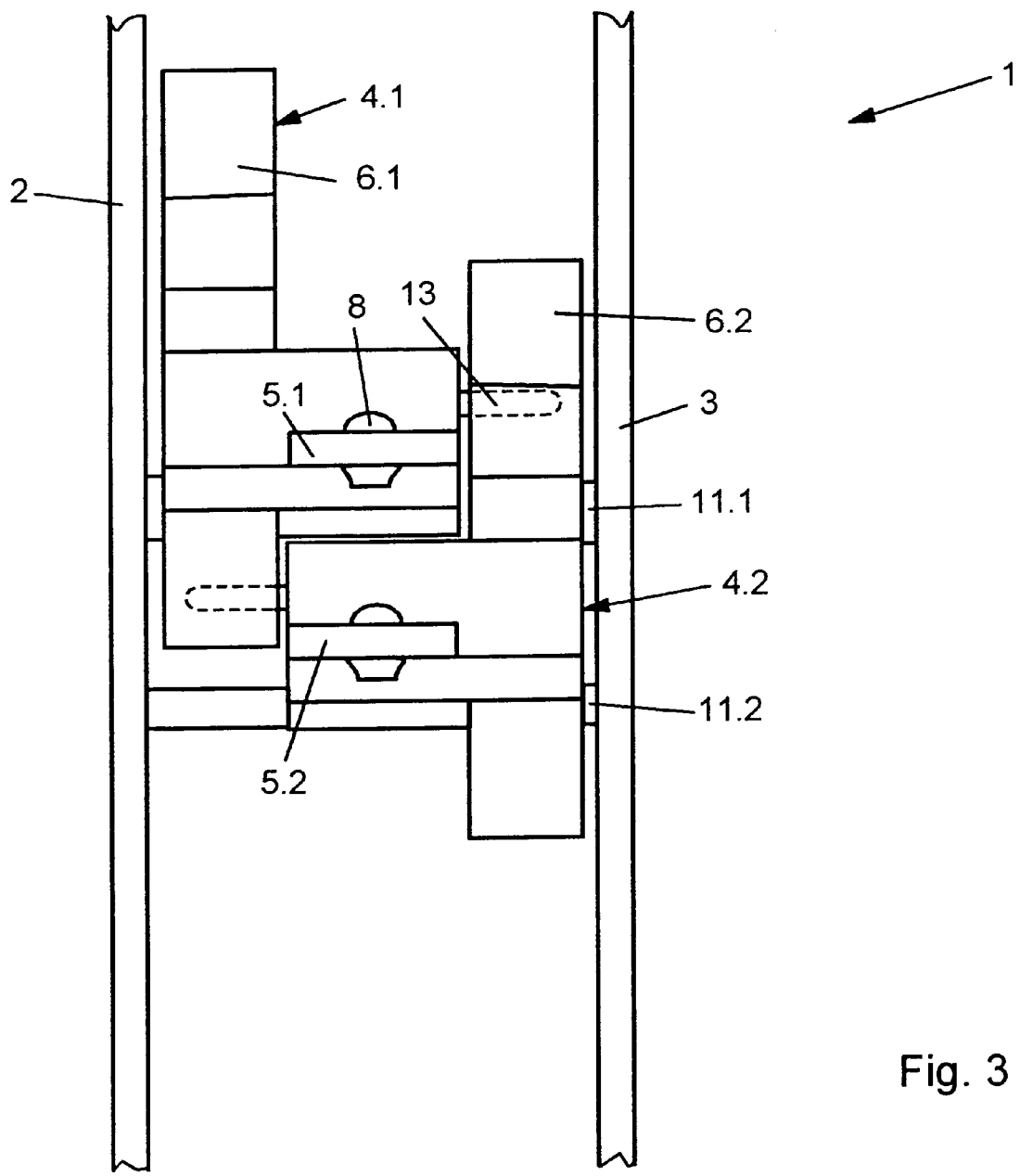
FIG. 3 shows a detail of the stacking column with two ratchet elements arranged one above the other.

For an explanation of a stacking column 1 according to FIG. 3, you are referred, in particular, to DE 38 11 310 C2, which is also contained in the present invention. Of the stacking column 1, FIG. 3 indicates two side walls 1 and 3, between which two ratchet elements 4.1 and 4.2 are mounted in a rotatable manner. The corresponding pivot pins 11.1 and 11.2 pass through the ratchet elements 4.1 and 4.2 and are inserted in the side walls 2 and 3.

Figure 4:
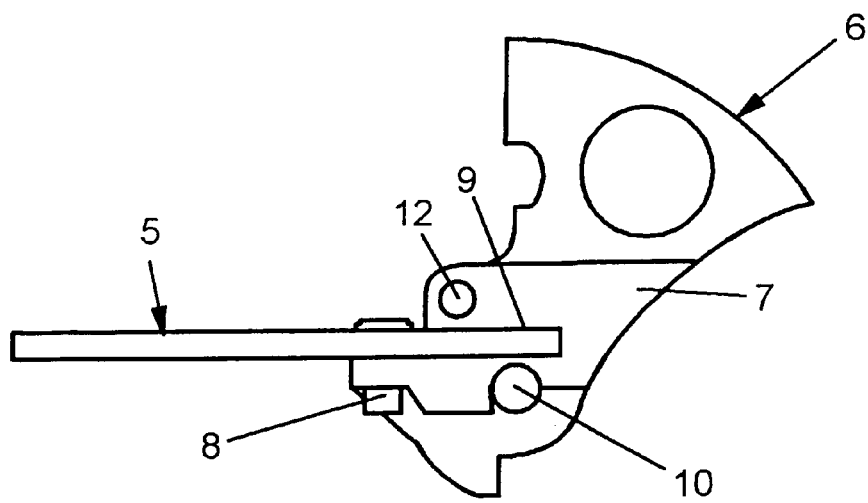
FIG. 4 shows a side view of a ratchet element according to the invention.
Figure 5:
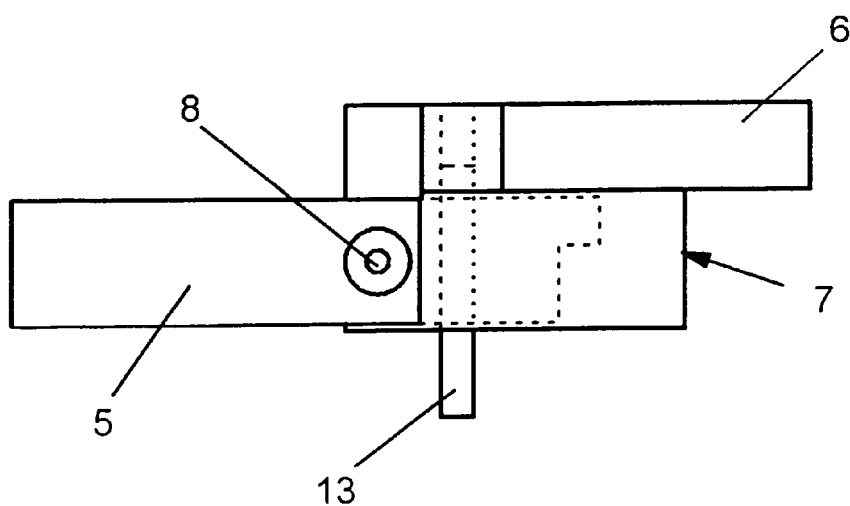
FIG. 5 shows a plan view of the ratchet element according to FIG. 4.

According to FIGS. 4 and 5, each ratchet element 4 comprises a carrying arm 5 and a control arm 6. A basic body 7 is provided on the control arm 6, and is preferably connected integrally to the control arm 6. In contrast, the basic body 7 and carrying arm 5 are connected by a rivet 8.

The basic body 7/the control arm 6 and the carrying arm 5 preferably consist of different materials. Plastic is expedient for the control arm 6/basic body 7, while a metallic material is preferred for the carrying arm 5. However, all possible variations are conceivable here and fall within the scope of the invention.

For the purpose of receiving the carrying arm 5, a slit 9 is formed in the basic body 7, and the carrying arm 5 is pushed into said slit before the rivet 8 is fitted. The basic body 7 has passing through it, on the one hand, a bore 10 for the purpose of receiving the pivot pin 11.1 or 11.2 and, on the other hand, a bore 12 for the purpose of receiving a pin 13, which is merely indicated by dashed lines in FIG. 3. Said pin 13 serves as a stop for the control arm of a following ratchet element.

It can be seen in FIGS. 1a, 1b and 2a, 2b that different ratchet elements 4.1 and 4.2 are used for a stacking column 1. In the case of a left-hand ratchet element 4.1, a control arm 6.1 is positioned on the left-hand side of the basic body 7.1, while a slit 9.1 extends on the right-hand side. In this case, an inner wall 14 of the slit 9.1 runs approximately in the plane of an inner surface 15 of the control arm 6.1. In the case of the right-hand ratchet 4.2, the arrangement of control arm 6.2 and slit 9.2 is exactly reverse.

The present invention functions as follows:

According to FIG. 3, a left-hand ratchet element 4.1 and a right-hand ratchet element 4.2 are arranged alternately one above the other. In this case, the corresponding carrying arms 5.1 are located approximately in one plane one above the other, while the corresponding control arms 6.1 and 6.2 are arranged in an offset manner in relation to the carrying arms 5.1 and 5.2, with the result that they can brush past the basic bodies of the following ratchet elements in each case. All that is important is for the carrying arms 5.1 and 5.2 to be arranged more or less exactly one above the other.

What is claimed is:

1. A stacking column for storing articles comprises:

a plurality of ratchet elements, each ratchet element having a carrying arm and a control arm, said plurality of ratchet elements being arranged successively substantially in one plane such that (1) the carrying arms of each ratchet element are arranged generally in one vertically extending plane and (2) the control arm of each ratchet element is arranged in a laterally offset manner relative to the carrying arm of the same ratchet element between any two successive ratchet elements, wherein the control arms of the ratchet elements are arranged in a laterally alternating manner relative to said one vertically extending plane.

2. The stacking column as claimed in claim 1, wherein the control arm (6) consists of plastic and the carrying arm (5) consists of a metallic material.

3. The stacking column as claimed in claim 1, wherein the carrying arm (5) is connected to the control arm (6) via a rivet (8).

4. The stacking column as claimed in claim 1, wherein the control arm (6) is connected to the carrying arm (5) via a basic body (7).

5. The stacking column as claimed in claim 4, wherein a slit is formed in the basic body for the purpose of receiving the carrying arm.

6. The stacking column as claimed in claim 5, wherein the slit terminates with an inner wall approximately in the one vertically extending plane of an inner surface of the control arm.

7. The stacking column as claimed in claim 4, wherein the basic body has a bore for the purpose of receiving a pivot pin and a bore for the purpose of receiving a stop pin.

* * * * *